United States Patent [19]

Perry

[11] Patent Number: 4,731,231

[45] Date of Patent: Mar. 15, 1988

[54] NO REDUCTION USING SUBLIMATION OF CYANURIC ACID

[75] Inventor: Robert A. Perry, 524 Hazel St., Livermore, Calif. 94550

[73] Assignee: Robert A. Perry, Livermore, Calif.

[21] Appl. No.: 859,951

[22] Filed: May 5, 1986

[51] Int. Cl.$^4$ .......................... C01B 21/00; B01J 8/00
[52] U.S. Cl. ...................................... 423/235; 423/239
[58] Field of Search ................... 423/235, 235 D, 239, 423/239 A

[56] References Cited

FOREIGN PATENT DOCUMENTS 54-28771  3/1979  Japan .................................. 423/239

OTHER PUBLICATIONS

Back et al., "Photolysis of HNCO Vapor in the Presence of NO and $O_2$", Canadian Journal of Chemistry, 46, 531 (1968).

Perry, "Kinetics of the Reactions of NCO Radicals with $H_2$ and NO Using Laser Photolysis-Laser Induced Fluorescence", Jour. of Chemical Physics, 82, 5485 (1985).

Primary Examiner—Gregory A. Heller
Attorney, Agent, or Firm—Millen & White

[57] ABSTRACT

An arrangement for reducing the NO content of a gas stream comprises contacting the gas stream with HNCO at a temperature effective for heat induced decomposition of HNCO and for resultant lowering of the NO content of the gas stream. Preferably, the HNCO is generated by sublimation of cyanuric acid.

27 Claims, 1 Drawing Figure

NO REDUCTION USING SUBLIMATION OF CYANURIC ACID

The U.S. Government has rights in this invention pursuant to Contract No. DE-AC04-76DP-00789 between the U.S. Department of Energy and AT&T Technologies, Inc.

BACKGROUND OF THE INVENTION

This invention relates to a new method and device for removing $NO_x$ from gaseous material, e.g., from exhaust gas streams.

The recent emphasis on ecological and environmental concerns, especially air pollution, acid rain, photochemical smog, etc., has engendered a wide variety of proposed methods for removing $NO_x$ especially NO from gas streams.

Certain proposed techniques involve a great deal of capital outlay and require major consumption of additives, scrubbers, etc. For example, U.S. Pat. No. 3,894,141 proposes a reaction with a liquid hydrocarbon; U.S. Pat. No. 4,405,587 proposes very high temperature burning with a hydrocarbon; U.S. Pat. No. 4,448,899 proposes reaction with an iron chelate; and U.S. Pat. No. 3,262,751 reacts NO with a conjugated diolefin. Other methods utilize reactions with nitriles (U.S. Pat. No. 4,080,425), organic N-compounds (e.g., amines or amides) (DE No. 33 24 668) or pyridine (J57190638). Application of these reactions imposes organic pollutant disposal problems along with the attendant problems of toxicity and malodorous environments. In addition, they require the presence of oxygen and are relatively expensive.

Other systems are based on urea reactions. For example, U.S. Pat. No. 4,119,702 uses a combination of urea and an oxidizing agent which decomposes it, e.g., ozone, nitric acid, inter alia; U.S. Pat. No. 4,325,924 utilizes urea in a high temperature reducing atmosphere; and U.S. Pat. No. 3,900,554 (the thermodenox system) utilizes a combination of ammonia and oxygen to react with nitric oxide. All of these methods must deal with the problem of the odor of ammonia and its disposal. All require oxygen or other oxidizing agents. These methods also suffer from the drawback of requiring controlled environments which make them difficult to use in mobile vehicles or smaller stationary devices.

Japanese Publication No. J55051-420 does not relate to the removal of nitric oxide from gaseous systems, at least as reported in Derwent Abstract No. 38871C/22. It utilizes halocyanuric acid to remove malodorous fumes, e.g., mercaptans, sulfides, disulfides, ammonia or amines from gases by contact therewith followed by contact with activated carbon. Temperatures are reported as less than 80° C.; classical acid/base interactions appear to be involved (not pyrolysis decomposition products of the halocyanuric acid).

Back et al, Can. J. Chem. 46, 531 (1968), discusses the effect of NO on the photolysis of HNCO, the decomposition product of cyanuric acid. An increase of nitrogen concentration in the presence of large amounts of nitric oxide (torr levels) was observed utilizing a medium pressure mercury lamp for photolysis of HNCO. High temperature reactions were neither addressed nor involved; similarly, the effect, if any, of HNCO under any conditions on low amounts of NO (e.g., in the < torr to ppm range) was also not addressed. In fact, the increased concentration of nitrogen was associated by the authors with high NO levels. Their theorized reactions explaining the results would be important only at high NO levels.

Furthermore, use of cyanuric acid as a source of isocyanic acid (HNCO) for purposes of studying various properties of the latter or its subsequent degradation products is also known. See, e.g., Okabe, J. Chem. Phys., 53, 3507 (1970) and Perry, J. Chem. Phys., 82, 5485 (1985). However, heretofore it was never suggested that cyanuric acid could be useful in the removal of NO from gas streams.

As a result, there continues to be a need for a simple, relatively inexpensive, non-polluting, non-toxic, non-malodorous and regenerable system, method and device for removing nitric oxide from gas streams.

SUMMARY OF THE INVENTION

Accordingly, it is an object of this invention to provide such a system, method and device.

It is another object of this invention to provide such a method, system and device which is applicable to small stationary devices, mobile vehicles, as well as to larger applications, including smokestacks from plants, furnaces, manufacturing factories, kilns, vehicles, and essentially any other source of exhaust gas containing NO, particularly industrial gases.

Upon further study of the specification and appended claims, further objects and advantages of this invention will become apparent to those skilled in the art.

These objects have been attained by this invention by providing a method of reducing the NO content of a gas stream comprising contacting the gas stream with HNCO at a temperature effective for heat induced decomposition of HNCO and for resultant lowering of the NO content of the gas stream. It is preferred that the HNCO be generated by sublimation of cyanuric acid.

In another aspect, these objects have been achieved by providing a device useful for reducing the NO content of a gas stream comprising:
 means for storing a compound which upon sublimation generates HNCO;
 means for subliming said compound in operation;
 means for contacting said NO-containing gas stream with said generated HNCO; and
 means for raising the temperature of said gas contacted with HNCO to a level effective for heat induced decomposition of HNCO and resultant lowering of the NO content of the gas stream.

In yet another aspect, these objects have been achieved by providing in a conduit means for an effluent gas stream containing NO, the improvement wherein the conduit means further comprises device means for lowering the NO content of said gas, said device means comprising:
 compartment means for storing a compound which upon sublimation generates HNCO;
 means for heating said compound to a temperature at which it sublimes;
 means for contacting said NO-containing gas stream with said generated HNCO; and
 means for raising the temperature of said HNCO-contacted gas stream to a level effective for heat induced decomposition of HNCO and resultant lowering of the NO content of the gas stream.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DETAILED DISCUSSION

Figure 1:
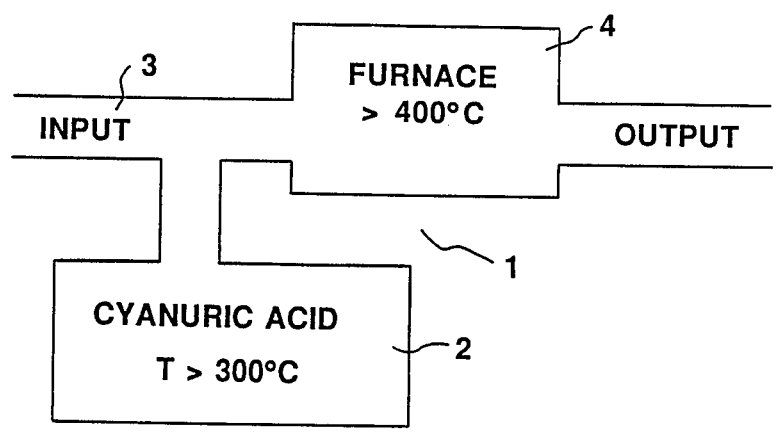
FIG. 1 schematically illustrates one possible configuration for carrying out the method of this invention and for configuring the device and/or improved conduit of this invention.

This invention provides many significant advantages over other theoretical and/or commercially available NO reducers. It is generically applicable to all industrial gas effluent streams, e.g., those mentioned in the references discussed above. It is very simple, inexpensive and portable. It does not require the use of catalysts and/or co-agents. In addition, when the preferred source of HNCO (cyanuric acid) is spent during operation, it can be simply and inexpensively replaced. It provides heretofore unachievable convenience and efficiency in reducing NO. Its non-toxicity is another major advantage as its ready availability and low cost.

As opposed to many of the other systems now available, that of this invention imposes minimal changes in otherwise preferred operating conditions for the engine, plant, factory, etc., which generates the effluent gas stream being purified. For example, as opposed to presently utilized catalytic converters, this invention does not impose a requirement that a vehicular engine be run rich with resultant undesirable lower compression ratios. In addition, the requirement for use of unleaded gas in order to avoid catalyst poisoning also does not apply. Overall, the efficacy of the system of this invention in lowering NO contents is extremely high.

Within the broadest scope of this invention, any source and/or means of generating HNCO and admixing it with the effluent stream can be used. For a variety of reasons including those discussed above, in the preferred embodiment, sublimation of cyanuric acid will be utilized:

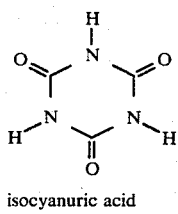
isocyanuric acid

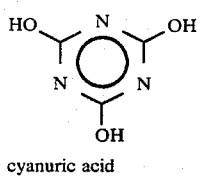
cyanuric acid

Isocyanuric acid is a tautomer of cyanuric acid. For purposes of this invention, the two are equivalent. The sublimation of cyanuric acid in accordance with the following equation,

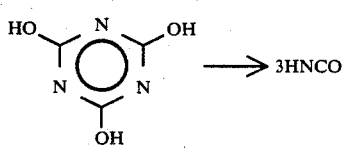

can be conducted at any temperature effective to cause a volatilization of sufficient HNCO for the desired purpose. In general, temperatures greater than 300° C. will be utilized since sublimation rates at lower temperatures are generally too low. Preferably, temperatures greater than 320° C. will be used, especially greater than 350° C. There is no preferred upper limit on temperature; but generally a temperature less than about 800° C. will be employed. The precise temperature for a given application can be routinely selected, perhaps with a few orientation experiments, in conjunction with considerations of the volume to be filled, the flow rate of the gas, the resultant residence time of the admixture of HNCO and NO in the effluent gas stream, the surface area of the HNCO source which is being sublimed and the sublimation rate which ensues in a given system upon selection of the given temperature. For example, for 50 g of a cyanuric acid sample having a surface area of about 20 cm$^2$, the sublimation rate achieved at a temperature of 450° C. is sufficient to reduce the NO level from a 50 l/m gas stream from 1000 ppm to essentially 0 ppm.

While cyanuric acid itself is the preferred source of HNCO, other sublimable solids can also be used for its generation. These include other compounds which are typical impurities in samples of cyanuric acid, including ammelide and ammeline

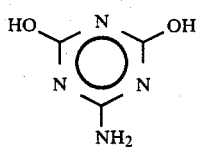
ammelide

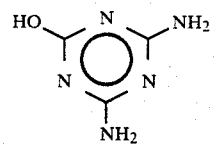
ammeline

In general, cyanuric acid wherein the OH groups are replaced by 1-3 NH$_2$, alkyl, NH-alkyl or N-alkyl$_2$ groups, are utilizable. Such alkyl groups typically will have 1-4 carbon atoms.

Also utilizable are oligomers of HNCO which are linear rather than cyclic as in cyanuric acid. For example, cyamelide is particularly noteworthy. Also utilizable are the known halocyanuric acids such as the mono-, di- or tri-chloro, bromo, fluoro or iodo acids or other various mixed-halo substituted acids.

Any means or technique which results in admixture of HNCO with the NO-containing gas is included within the scope of this invention. For example, if the effluent gas stream itself is at a sufficiently elevated temperature, it can be directly passed over a solid sample of the HNCO source to effect sublimation and instantaneous admixture. It is also possible to incorporate the solid HNCO source into a solvent therefor, most preferably hot water, and conventionally spray or inject the solution into the effluent gas stream. Of course, it is also possible to use conventional heating means (e.g., conductive, inductive, etc.) to heat the sublimable source of HNCO and then to conventionally conduct the resultant HNCO gas into admixture with the effluent stream. Steam injection preceded by passage of the steam over, through, etc., the HNCO source such as cyanuric acid can, of course, also be utilized.

It is also possible to indirectly admix the HNCO with the effluent gas stream. For example, if the HNCO is injected into the combustion chamber which produces the effluent gas stream or if the sublimable source such as cyanuric acid is so injected, the HNCO will be incorporated into the effluent gas stream at its point of generation. As long as the necessary reaction conditions are maintained for subsequent interaction of the HNCO with the NO in the gas stream, the NO reduction method of this invention will be accomplished. The latter option pertains to any system which generates an NO-containing stream, including vehicular engines (wherein the injection of cyanuric acid or HNCO can be accomplished via the conventional valves), furnaces, plants, etc. Alternatively, the admixture can be effected directly either downstream from the point of generation of the effluent gas or directly near or at this point, e.g., right at the head of the vehicular engine where the heat generated by the latter can be utilized, not only for sublimation of the solid source of HNCO, but also for effecting the NO reducing reactions based on the presence of HNCO.

The NO content of the effluent streams into which the HNCO has been admixed will be lowered as long as the temperature of the effluent stream is raised to a level at which HNCO thermally decomposes into products which result in lowering of the NO content. The precise elevated temperature reached is not critical and will be routinely selected, perhaps in conjunction with preliminary orientation experiments, in dependence on the relative amounts of NO and HNCO and especially the residence time produced by the volumes and flow rates involved. Generally, temperatures on the order of about 400° C. will suffice where residence times are greater than or equal to about one second. Higher temperatures can also be utilized, e.g., about 400° to 800° C.; however, there will be an upper limit where the nature of the dominant reactions will change. In the regime of 450°–700° C. free radical reactions produce NO in the presence of oxygen. At elevated temperatures i.e., greater than 1200° C., the presence of oxygen will make the production of nitric oxide unacceptable.

Pressure is typically not a critical variable under all realistic applications. Thus, pressures in the range from about 0.1–10 atmospheres as well as lower or higher values are employable.

The relative amounts of NO and HNCO are not critical. Typically, the system will be designed so that stoichiometric amounts are employed. Of course, excesses of either ingredient can be designed where desirable. In many applications, it will be desired to utilize very slight, environmentally acceptable excesses of NO in order to avoid excesses of HNCO. The latter is an acid which might recyclize to cyanuric acid at the low temperatures ensuing after the reaction has run its course. Thus, since the excess of NO can be chosen to be benignly low in view of the great efficacy of this invention in reducing NO contents, and since the products of the overall NO-reduction reactions are nitrogen, carbon dioxide, water and carbon monoxide (with a minor component of CO), the resultant system containing benign amounts of NO will cause no environmental concerns. Of course, where otherwise desirable, the system can also be run with slight excesses of HNCO. Where excesses are employed of either ingredient, these can, e.g., be in the range of about 1.01 to about 1.1 or more on a stoichiometric basis.

In a preferred mode of operation of this invention, the NO reduction reactions will be conducted in the presence of surfaces which act as a catalyst for the free radical reactions which effect the NO reduction. The nature of the surface is not critical as long as it is catalytically effective, metallic or otherwise. All those surfaces well known to catalyze related free radical reactions will be employable, e.g., metallic surfaces, oxides, etc. For metallic systems, preferably, the metal component will be iron which will typically be provided by the steel, stainless steel, or other iron-based surfaces utilized in plants, vehicles, factories, etc., and especially utilized in the conduits containing effluent gas streams, e.g., mufflers, smokestacks, etc. Other typical metals include the usual transition metals, e.g., the noble metals, including platinum, palladium, rhodium, silver, gold, etc. as well as nickel, cobalt, chromium, manganese, vanadium, titanium, etc. In a further preferred embodiment, the reaction will be conducted in a chamber containing particles of such catalytic surfaces, e.g., pellets, beads, granules, etc. The particle sizes and distributions are not critical. As usual, the greater the surface area, the more efficient this effect will be. Where catalytic surfaces are utilized, residence times can be shorter and temperatures can be lower under otherwise identical conditions. Without wishing to be bound by theory, it is felt that the catalytic effect is primarily exerted in initiating the generation of free radicals triggering chain reactions necessary for the NO reduction.

Other components may also be present in the NO-containing stream without adversely impacting this invention. For example, where $NO_2$ is involved, it also will be removed by this invention. However, under the normal conditions where NO is a problem, $NO_2$ often is not a problem. The amount of NO in the effluent gas stream also is not critical. Typically, the amounts will be 1 ppm or more, e.g., 1–10,000 ppm or 10–5,000 ppm, typically 100–1,000 ppm, etc. By routine, judicious selection of reaction conditions as described above, the amount of NO after admixture with HNCO can be reduced to any desired low level, including 0 ppm within limits of detection. Greater reductions in NO contents in a given system can be achieved by utilizing longer residence times and higher temperatures.

FIG. 1 illustrates one embodiment of a system of this invention. The overall "device" 1 simply comprises means such as chamber 2 for holding the sublimable compound; means for heating the latter to its sublimation temperature, e.g., in FIG. 1 the means simply being the input gas stream 3 which is at an elevated temperature; means for contacting the resultant HNCO with the input stream, which here simply comprises the adjoining conduits whereby the input stream heats the cyanuric acid and the resultant HNCO is instantaneously mixed with the input stream; and means for conducting the reaction, here illustrated by furnace 4. Many other equivalents will be very clear to skilled workers. For example, one or both of the storage chamber and the furnace can be inductively, conductively, radiatively, etc., heated using external sources other than the input stream itself. One or both of storage chamber and furnace region can be located anywhere along the path of the effluent stream, e.g., they can be located right at the head of an engine or the exhaust outlet of a furnace or plant. As discussed above, it is even possible for the storage means to be located upstream of the chamber which produces the effluent stream where this is practical. Conventional heat exchange means can also be incorporated into the system wherever desirable. In FIG. 1, the heat exchange means is the input gas itself.

Without wishing to be bound by theory, the following is a proposed mechanism for the NO reduction system:

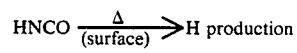

$$NH_2 + NO \longrightarrow N_2H + OH \longrightarrow$$

$$N_2 + H + OH \longrightarrow N_2 + H_2O$$

$$N_2H \longrightarrow N_2 + H$$

$$OH + CO \longrightarrow CO_2 + H$$

As can be seen, free radicals are generated which cause chain reactions to ensue. This explains both the speed and high efficiency of the system in removing NO from the gas stream. The reaction mechanism is highly surprising since the weakest bond in the HNCO molecule has a strength of about 60 kcal whereupon it would have been expected that a much higher temperature than those in the range of 400°–800° C. would be necessary for a significant effect based on decomposition of HNCO.

This mode of action also serves to further clarify the distinction between this invention and the more conventional chemistry known for HNCO, e.g., that is described in Back et al., supra. In the latter, no elevated temperatures were used; only a purely photolytic decomposition of HNCO was effected. In addition, the lower of NO content mentioned in this reference related only to relatively high pressures of NO in the several torr range.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

A 7.2 horsepower Onan diesel engine was utilized for the experiment. Its exhaust had a flow-rate of 100 l/m. A 2 l/m sample was introduced into a cyanuric acid sublimation chamber. The latter contained 50 g of cyanuric acid and the sublimation occurred at 350° C. Thereafter, the mixture of HNCO and exhaust gas was passed through a furnace region packed with a bed of steel ball bearings. The temperature in the furnace region was maintained at a temperature equal to or greater than 450° C. utilizing a conventional heater. The effluent from the furnace region was passed into a $NO_x$ analyzer. The residence time in the furnace was about 1 second.

The exhaust gas from the diesel engine included the usual soot, water, oxygen and $CO_2$. Its 500 ppm NO content was reduced to less than 1 ppm (i.e., to the sensitivity level of the $NO_x$ analyzer). The load on the engine varied from 0.23 to 0.8 with no effect observed on the process.

EXAMPLE 2

Under the conditions of Example 1, 5 pounds of cyanuric acid (2.27 kg) is loaded into the holding chamber. This provides enough active ingredient (53 moles of HNCO) to remove approximately 50 moles of NO. At a typical NO concentration in a vehicle exhaust of 500 ppm, $2.5 \times 10^7$ liters of gas can be scrubbed. This is sufficient to remove NO from the exhaust gas of automobiles for a driving range of approximately 1,500 miles.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of reducing the NO content of a gas stream comprising contacting the gas stream with an amount of HNCO at a temperature effective for heat induced decomposition of HNCO, said amount and temperature being effective for resultant lowering of the NO content of the gas stream and said HNCO having been previously generated in gaseous form prior to being conducted into admixture with said gas stream.

2. A method of claim 1, wherein the HNCO is generated by sublimation of cyanuric acid.

3. A method of claim 1 wherein said HNCO was generated by sublimation of a sublimable source of HNCO and the resultant gaseous HNCO was then conducted into admixture with said gas stream.

4. A method of claim 2, wherein the sublimation of cyanuric acid is effected at a temperature of about 350° C. to about 800° C.

5. A method of claim 2, wherein the amount of HNCO is approximately stoichiometric with respect to the NO.

6. A method of claim 2, wherein the NO-containing gas stream is an effluent gas stream.

7. A method of claim 6, wherein the effluent gas stream is a vehicle exhaust gas stream.

8. A method of claim 1, wherein the gas is contacted with HNCO at a temperature of about 400° C. to about 800° C.

9. A method of claim 2, wherein the sublimable solid is cyanuric acid and it is injected into the gas stream as a hot water solution.

10. A method of claim 2 wherein said gas stream also comprises $NO_2$ and the $NO_2$ content of the gas stream is also lowered.

11. A method of reducing the NO content of a gas stream comprising contacting the gas stream with an amount of HNCO at a temperature effective for heat induced decomposition of HNCO, said amount and temperature being effective for resultant lowering of the NO content of the gas stream, and wherein said contacting is carried out in the presence of a surface which is effective as a catalyst for at least one of the reactions between heat induced decomposition products of HNCO and other components in said gas stream, which reactions lead to lowering of the NO content of the gas stream, or is effective as a catalyst for generating free radicals in the thermal decomposition of HNCO.

12. A method of claim 11, wherein said surface comprises iron.

13. A method of claim 11 wherein said surface contains a metal which is iron, a noble metal, nickel, cobalt, chromium, manganese, vanadium or titanium.

14. A method of claim 13 wherein said catalytic surface is in the shape of pellets, beads or granules.

15. A method of claim 11 wherein said catalyst is effective for generating free radicals in the thermal decomposition of HNCO.

16. A method of claim 15 wherein said contacting is carried out at a temperature lower than that necessary to effect said thermal decomposition in the absence of said catalyst.

17. A method of claim 11, wherein the HNCO is generated by sublimation of cyanuric acid.

18. A method of reducing the NO content of a gas stream comprising contacting the gas stream with an amount of HNCO at a temperature effective for heat induced decomposition of HNCO, said amount and temperature being effective for resultant lowering of the NO content of the gas stream, and said HNCO being added to said gas stream as a solution of a sublimable solid in a solvent therefor, said sublimable solid producing HNCO upon sublimation.

19. A method of claim 18, wherein the HNCO is generated by sublimation of cyanuric acid.

20. A method of claim 18, wherein the sublimable solid is injected into said gas stream by stream injection.

21. A method of reducing the NO content of a gas stream comprising contacting the gas stream with an amount of HNCO at a temperature effective for heat induced decomposition of HNCO, said amount and temperature being effective for resultant lowering of the NO content of the gas stream, and wherein the HNCO is generated by sublimation of a solid other than cyanuric acid which produces HNCO upon sublimation.

22. A method of claim 21, wherein the HNCO is generated by sublimation of a sublimable substituted derivative of cyanuric acid which produces the HNCO upon sublimation, or by sublimation of cyamelide.

23. A method of claim 22 wherein said derivative has the structure of cyanuric acid wherein 1-3 of its OH groups are replaced by Cl, Br, F, I, $NH_2$, $C_{1-4}$-alkyl, $NH-C_{1-4}$-alkyl, $N-(C_{1-4}$-alkyl$)(C_{1-4}$-alkyl$)$ or a combination thereof.

24. A method of reducing the NO content of a gas stream comprising contacting the gas stream with an amount of HNCO at a temperature effective for heat induced decomposition of HNCO, said amount and temperature being effective for resultant lowering of the NO content of the gas stream, and wherein the temperature of the gas stream is less than about 800° C.

25. A method of claim 24 with the proviso that said gas stream temperature is not 600° C.

26. A method of claim 25 wherein said gas stream temperature is about 400° to less than about 800° C.

27. A method of claim 25, wherein the HNCO is generated by sublimation of cyanuric acid.

* * * * *